(12) United States Patent
Wong et al.

(10) Patent No.: US 7,877,062 B2
(45) Date of Patent: Jan. 25, 2011

(54) MOBILE PHONE AND AMBIENT NOISE FILTERING METHOD USED IN THE MOBILE PHONE

(75) Inventors: Shih-Fang Wong, Taipei Hsien (TW); De-Zhi Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 666 days.

(21) Appl. No.: 11/941,971

(22) Filed: Nov. 19, 2007

(65) Prior Publication Data

US 2008/0119221 A1    May 22, 2008

(30) Foreign Application Priority Data

Nov. 20, 2006    (CN) .................. 2006 1 0201112

(51) Int. Cl.
*H04B 17/00*    (2006.01)
(52) U.S. Cl. ................ 455/63.1; 455/67.13; 455/114.2; 455/222; 381/13; 381/73.1
(58) Field of Classification Search .......... 455/63.1–65, 455/67.13, 114.2, 222, 223, 277.2, 278.1, 455/28, 296, 501, 570, 550.1; 381/13, 46, 381/71, 71.1, 71.14, 73.1, 94, 94.1, 94.5, 381/94.7, 94.8, 317
See application file for complete search history.

(56) References Cited

U.S. PATENT DOCUMENTS

| 5,349,701 | A | * | 9/1994 | Lobel ........................ 455/222 |
| 6,108,610 | A | * | 8/2000 | Winn ......................... 702/77 |
| 6,266,633 | B1 | | 7/2001 | Higgins et al. |
| 6,810,273 | B1 | * | 10/2004 | Mattila et al. ............... 455/570 |
| 2002/0044597 | A1 | * | 4/2002 | Shively et al. .............. 375/222 |
| 2004/0247110 | A1 | | 12/2004 | Harvey |

* cited by examiner

*Primary Examiner*—Charles N Appiah
*Assistant Examiner*—Marisol Fahnert
(74) *Attorney, Agent, or Firm*—Frank R. Niranjan

(57) ABSTRACT

An exemplary ambient noise filtering method includes: sampling ambient noise signals to obtain multiple groups of sampled signals; analyzing each group of the sampled signals in each sampling period to determine ambient noise frequency band(s) in each sampling period, wherein the ambient noise frequency band is a frequency band where the ambient noise distributes; determining main noise frequency band(s) by statistically analyzing all the ambient noise frequency bands, wherein the main noise frequency band is a frequency band where the ambient noise concentrates and mainly distributes; and filtering the ambient noise out of signals generated during a communication by filtering the determined main noise frequency band(s) if the main noise frequency band(s) does not have a same range as that of a speech frequency band. Related exemplary mobile phone performing the method is also provided.

10 Claims, 8 Drawing Sheets

MOBILE PHONE AND AMBIENT NOISE FILTERING METHOD USED IN THE MOBILE PHONE

BACKGROUND

1. Technical Field

The present invention relates to ambient noise filtering methods, and particularly to an ambient noise filtering method used in a mobile phone.

2. General Background

With the increased pace of modern life, the ability to communicate anywhere and anytime is important to many people. One result is the increasing use of mobile phones. Mobile phones have enabled individuals to communicate while being in a variety of environments, such as airplanes, cars, restaurants, and other places. Some of these environments are associated with considerable ambient noise that makes it difficult to clearly transmit and receive intelligible speech at an audible level.

As a result, the individuals on a phone conversation may often have to repeat themselves, which is inconvenient, time-consuming, inefficient and costly. Alternatively, they may shout or raise their voice to be heard over the ambient noise, which compromises the privacy of the conversation. A person in a noisy environment may also increase the volume of the mobile phone in order to hear the person who is speaking on the other hand.

Manually adjusting the volume level in response to loud ambient noise is tedious for both the individual at the speaking end and the individual at the listening end. Furthermore, manually increasing volume in response to the ambient noise is undesirable since the volume must be later manually decreased to avoid acutely loud reception when the ambient noise dies down. In addition, if the mobile phone user raises his voice to be heard on the other end of the line, this has the undesirable effect of increasing the ambient noise in the user's environment.

Indeed, within a given environment, the level of the ambient noise may fluctuate, for example, in a car, the ambient noise may vary depending on a number of external factors, such as the amount of traffic, the speed of the car, the output of the car stereo, the engine, the type of road, and other variable factors. In such environment, manually adjusting the volume in response to each instance that the ambient noise increases or decreases is not only tedious but distracting and can be dangerous.

What is needed, therefore, is a mobile phone capable of automatically filtering ambient noise and an ambient noise filtering method used therein.

SUMMARY

A mobile phone capable of filtering ambient noise is provided. The mobile phone includes a storage unit, a microphone, an analog-to-digital converter (ADC), and a processing unit. The microphone is configured for receiving input audio signals and transforming the received input audio signals into analog signals. The ADC is configured for converting the analog signals from the microphone into digital signals. The processing unit includes a sampling module, an analyzing module, a filtering parameter determining module, and a filtering module.

The sampling module samples the digital signals from the ADC to obtain sampled signals. The analyzing module analyzes the sampled signals from the sampling module in each sampling period to determine ambient noise frequency band(s) in each sampling period, wherein the ambient noise frequency band is a frequency band where the ambient noise distributes. The filtering parameter determining module statistically analyzes the ambient noise frequency bands in all sampling periods to determine main noise frequency band(s), wherein the main noise frequency band is a frequency band where the ambient noise concentrates and mainly distributes. The filtering module filters ambient noise out of signals generated during a communication by filtering the main noise frequency band(s) if the main noise frequency band(s) does not have a same range as that of a speech frequency band.

An ambient noise filtering method adapted for the mobile phone is also provided. The method includes: (a) receiving ambient noise during a predetermined period of the absence of speech and transforming the received ambient noise into analog ambient noise signals; (b) converting the analog ambient noise signals into digital ambient noise signals; (c) sampling the digital ambient noise signals to obtain multiple groups of sampled signals; (d) analyzing each group of the sampled signals in each sampling period to determine ambient noise frequency band(s) in each sampling period, wherein the ambient noise frequency band is a frequency band where the ambient noise distributes; (e) determining main noise frequency band(s) by statistically analyzing all the ambient noise frequency bands, wherein the main noise frequency band is a frequency band where the ambient noise concentrates and mainly distributes; and (f) filtering the ambient noise out of signals generated during a communication by filtering the determined main noise frequency band(s) if the main noise frequency band(s) does not have a same range as that of a speech frequency band.

Other novel features and advantages will be drawn from the following detailed description with reference to the attached drawings.

BRIEF DESCRIPTION OF THE DRAWINGS

The components of the drawings are not necessarily drawn to measuring scale, the emphasis instead being placed upon clearly illustrating the principles of the mobile phone. Moreover, in the drawings, like reference numerals designate corresponding parts throughout the several views.

DETAILED DESCRIPTION OF EMBODIMENTS

Figure 1:
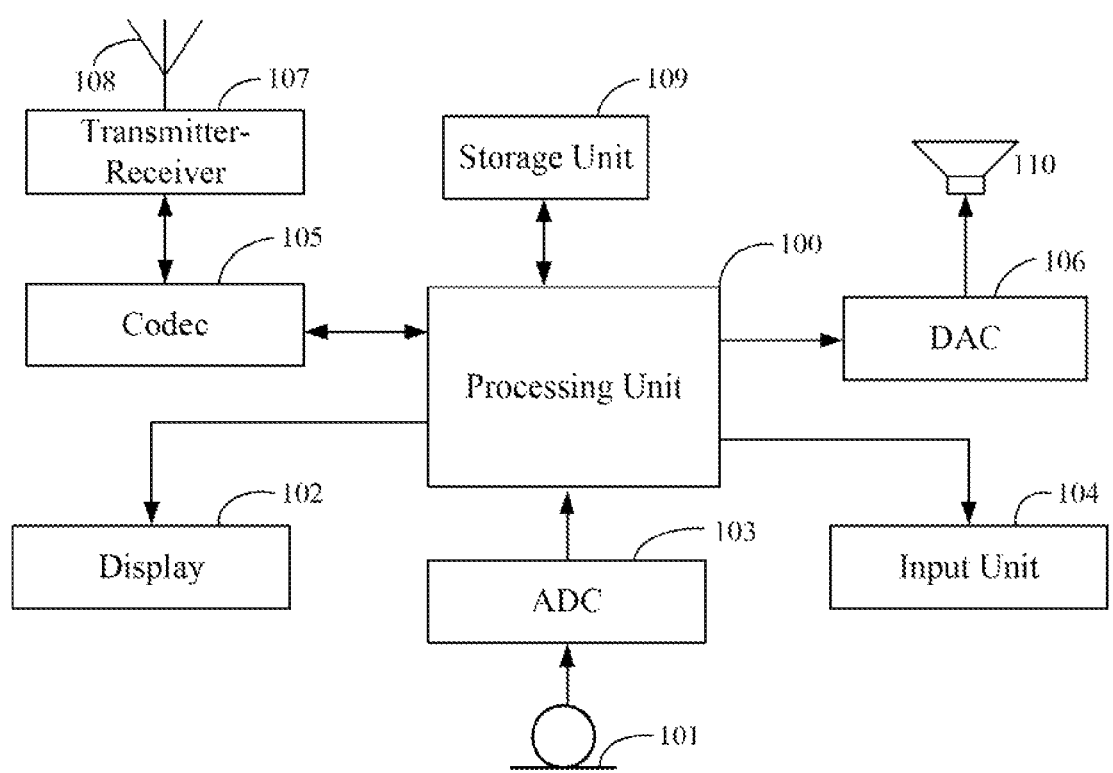
FIG. 1 is a block diagram of a hardware infrastructure of a mobile phone.

FIG. 1 is a block diagram of a hardware infrastructure of a mobile phone in accordance with a preferred embodiment of the present invention. The mobile phone includes a processing unit 100, a microphone 101, a display unit 102, an analog-to-digital converter (ADC) 103, an input unit 104, a codec 105, a digital-to analog converter (DAC) 106, a transmitter-receiver 107, an antenna 108, a storage unit 109, and a speaker 110.

The storage unit 109 includes a read only memory (ROM), a random access memory (RAM), and a non-volatile memory. The ROM stores programs, for example, operating system (OS) software for controlling components of the mobile phone. The RAM acts as a working memory for the processing unit 100. The non-volatile memory, typically a flash-based removable memory storage card, which provides the mobile phone with an additional storage capacity, typically 16 megabyte to 1 gigabyte, is used for storing pictures, music and games, all of which are supported by the mobile phone's different functionalities.

The input unit 104 has a plurality of keys (not shown), which may be an alphanumeric keypad. When a user of the mobile phone presses a key of the input unit 104, a signal representing the pressed key is outputted from the input unit 104 to the processing unit 100.

The display unit 102 includes a liquid crystal display (LCD) (not shown) and a control circuit (not shown). The control circuit is configured for controlling the display of the LCD and displaying a text, graphic, or a combination of the text and the graphic for visual feedback during operation the mobile phone. The control circuit is controlled by the processing unit 100.

The microphone 101 is configured for receiving input audio signals, including speech and/or ambient noise, and for transforming the received input audio signals into analog signals. The ADC 103 is configured for converting the analog signals from the microphone 101 to digital signals.

The antenna 108 is configured for sending and receiving signals in a predetermined frequency band to and from base stations (not shown). In reception, the antenna 108 feeds the signals received from the base stations to the transmitter-receiver 107. In transmission, the antenna 108 puts signals from the transmitter-receiver 107 on a carrier wave of a predetermined frequency band and sends the signals to the base stations.

The transmitter-receiver 107 has a modulator-demodulator for modulation and demodulation of signals. In reception, the modulator-demodulator performs a process of demodulating signals from the antenna 108 into signals that can be processed by the codec 105. In transmission, on the other hand, the modulator-demodulator performs a process of modulating digital signals, resulting from conversion at the codec 105, into signals that can be carried on the carrier wave.

The codec 105 is configured for converting the signals from the modulator-demodulator into digital signals, and for converting the signals from the processing unit 100 into analog signals and compressing the converted signals into particular data suitable for transmission.

The processing unit 100 is configured for performing a general control over each of components of the mobile phone according to the programs loaded in the ROM. Further, the processing unit 100 is programmed to have an ambient noise filter function described later.

Figure 2:
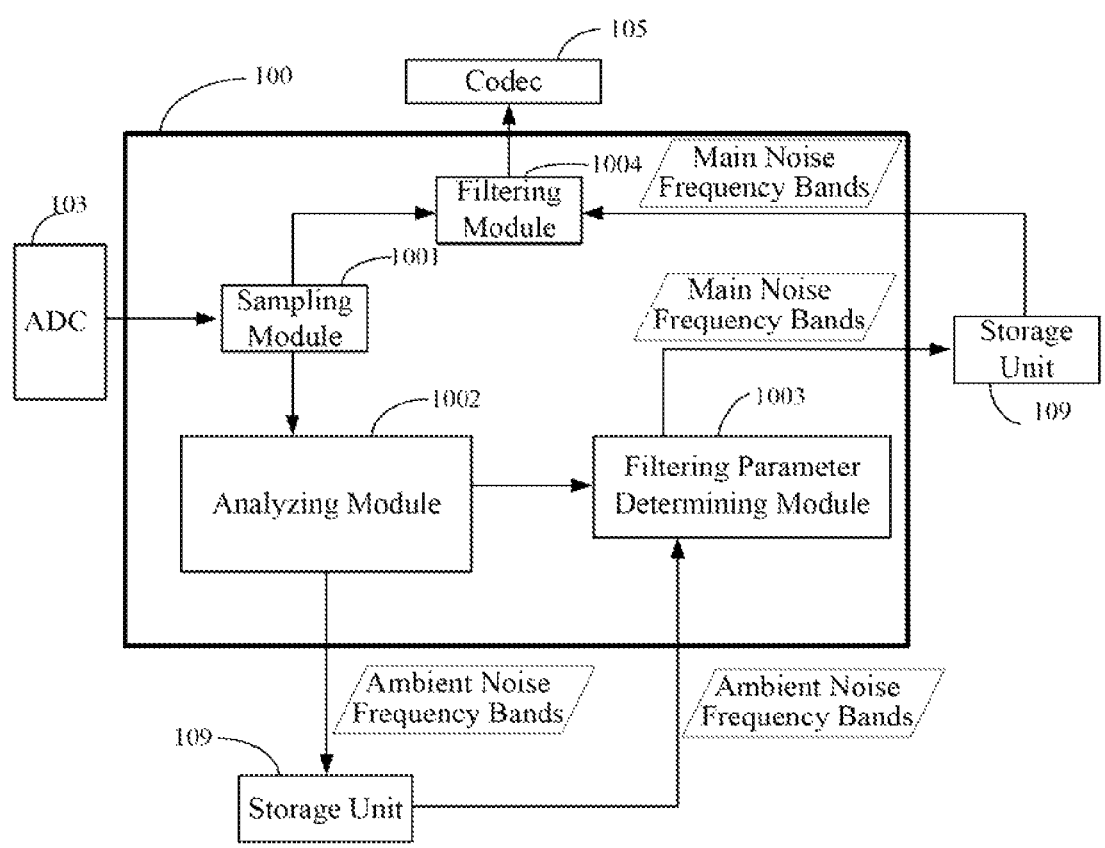
FIG. 2 is a block diagram showing main function modules of a processing unit of FIG. 1.

FIG. 2 is a block diagram showing the main function modules of the processing unit 100 of FIG. 1 in accordance with a preferred embodiment of the present invention. The processing unit 100 includes a sampling module 1001, an analyzing module 1002, a filtering parameter determining module 1003, and a filtering module 1004.

The sampling module 1001 is configured for sampling the digital signals from the ADC 103 to obtain sampled signals.

The analyzing module 1002 is configured for analyzing the sampled signals from the sampling module 1001 in each sampling period to determine ambient noise frequency band(s) in each sampling period, and for storing the determined ambient noise frequency band(s) in each sampling period in the RAM. Wherein, the ambient noise frequency band is a frequency band where the ambient noise distributes.

The filtering parameter determining module 1003 is configured for statistically analyzing the ambient noise frequency bands in all sampling periods to determine main noise frequency band(s), and for storing the determined main noise frequency band(s) in the RAM. Wherein the main noise frequency band is the frequency band where the ambient noise concentrates and mainly distributes.

The filtering module 1004 is configured for filtering the ambient noise out of signals generated during a communication by filtering the main noise frequency band(s), and for transmitting the sampled signals after filtering to the codec 105.

Figure 3:
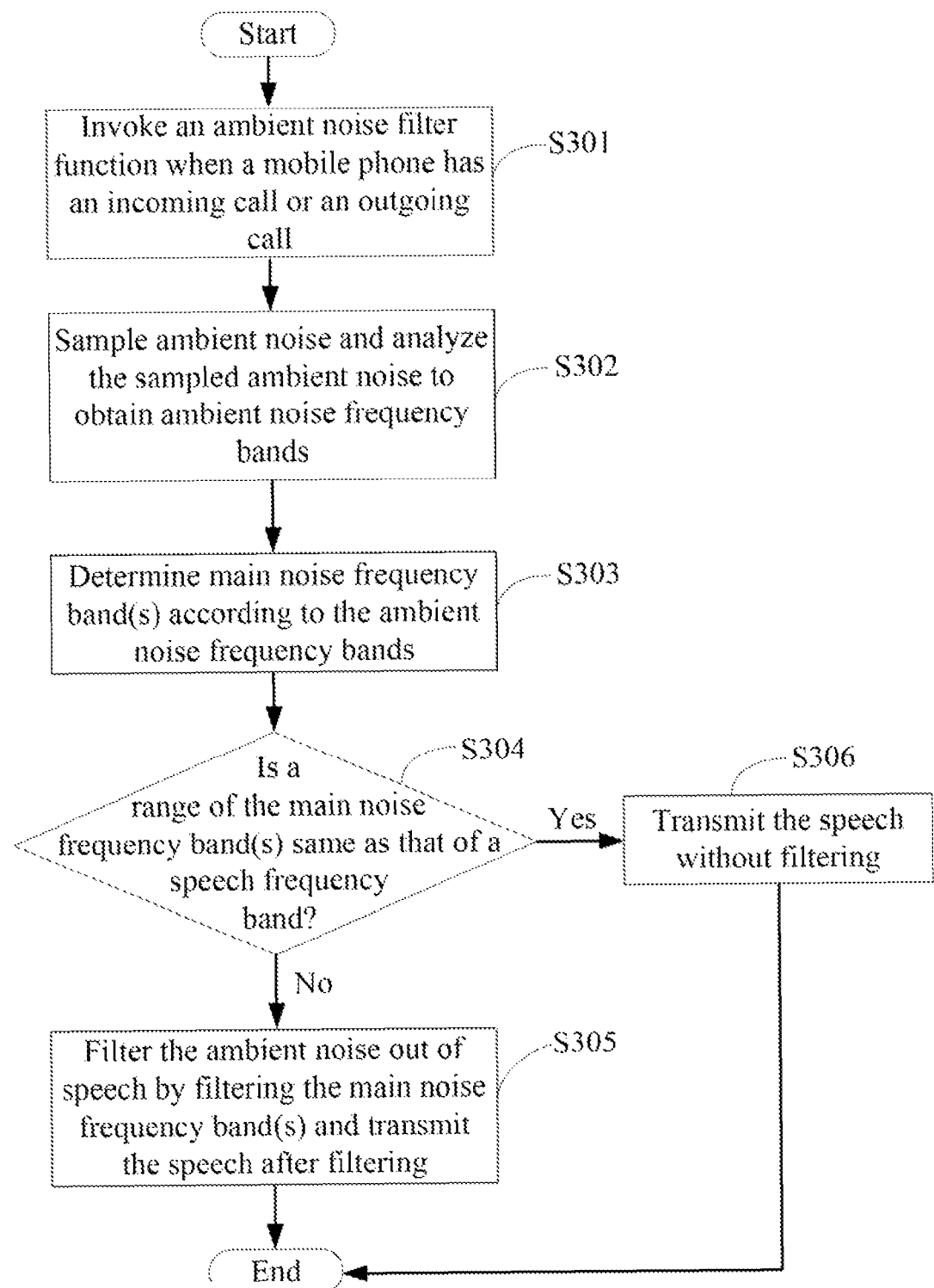
FIG. 3 is a flowchart diagram of an ambient noise filtering method performed by the mobile phone of FIG. 1.

FIG. 3 is a flowchart diagram of an ambient noise filtering method performed by the mobile phone of FIG. 1 in accordance with a preferred embodiment of the present invention. In step S301, the ambient noise filter function is automatically invoked when the mobile phone has an incoming call or outgoing call.

In step S302, the microphone 101 receives the ambient noise during a predetermined period of the absence of speech, e.g., two seconds, and transforms the received ambient noise into analog ambient noise signals. The ADC 103 converts the analog ambient noise signals into digital ambient noise signals. The sampling module 1001 repetitiously samples the digital ambient noise signals to obtain multiple groups of sampled signals. The analyzing module 1002 analyzes each group of the sampled signals in each sampling period to determine the ambient noise frequency band(s) in each sampling period, and stores the determined ambient noise frequency band(s) in each sampling period in the RAM.

In step S303, the filtering parameter determining module 1003 determines the main noise frequency band(s) by statistically analyzing all the ambient noise frequency bands in the RAM.

In step S304, the filtering module 1004 obtains a speech frequency band, and determines whether the speech frequency band has a same range as that of the main noise frequency band(s). Wherein, the speech frequency band is a frequency band where speech mainly distributes. The speech frequency band can be preloaded in the ROM or can be obtained in the same process as that of obtaining the main noise frequency band(s).

If the speech frequency band does not have the same range as that of the main noise frequency band(s), in step S305, the filtering module 1004 filters the ambient noise out of signals generated during a communication by filtering the determined main noise frequency band(s) from the signals. That is, the filtering module 1004 filters out the ambient noise having the determined main noise frequency band(s) that are outside of the speech frequency band.

If the speech frequency band has the same range as that of the main noise frequency band(s), in step S306, the filtering module 1004 performs a no operation on the signals generated during the communication, namely where the signals are directly transmitted out without filtering.

Figure 4:
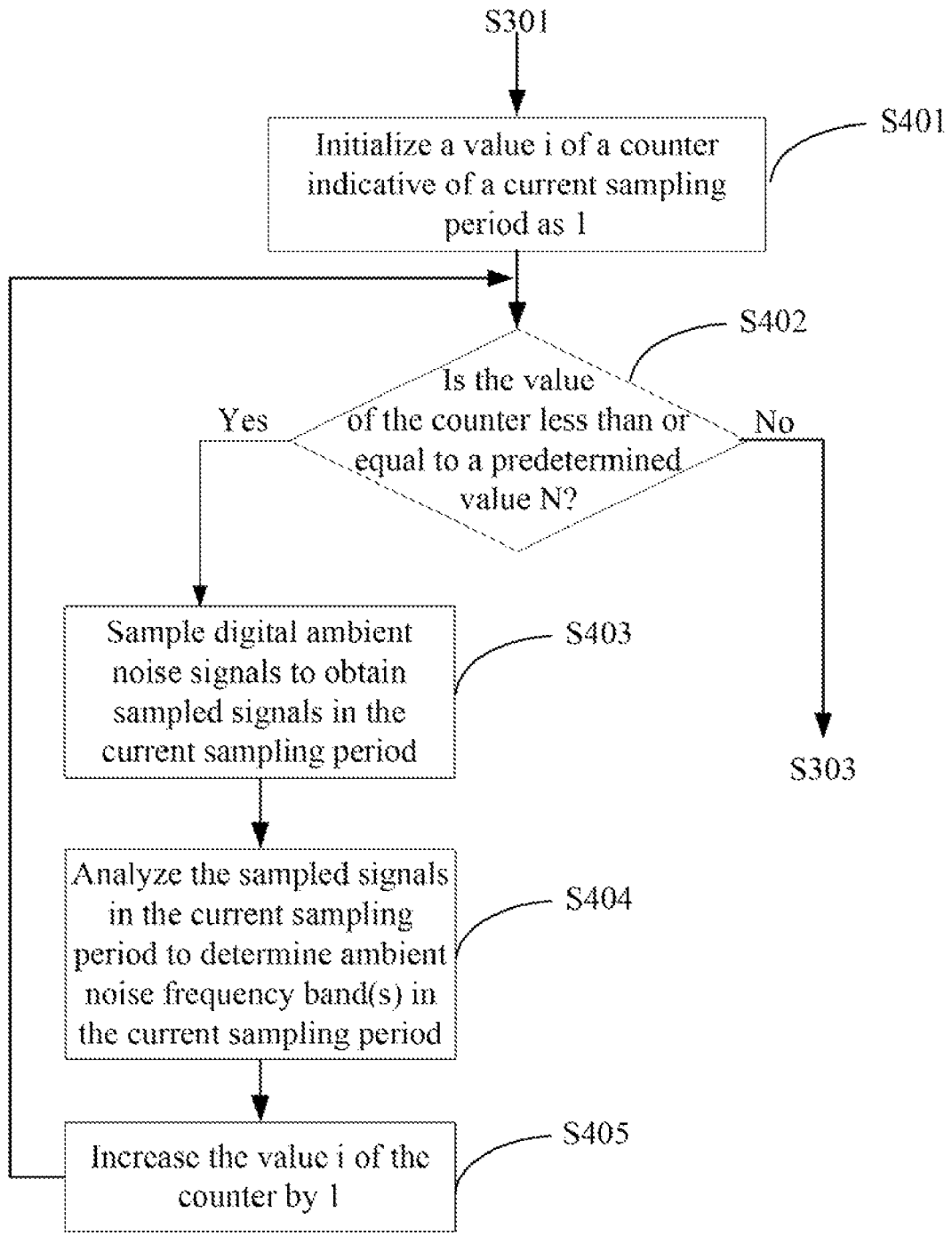
FIG. 4 is a flowchart of a preferred method of implementing step S302 of FIG. 3.

FIG. 4 is a flowchart of a preferred method of implementing step S302 of FIG. 3, namely determining the ambient noise frequency band(s) in each sampling period. In step S401, the sampling module 1001 initializes a value "i" of a counter indicative of a current sampling period as 1.

In step S402, the sampling module 1001 determines whether the value "i" of the counter is less than or equal to a predetermined value "N". If the value "i" of the counter is larger than the predetermined value "N", the procedure goes to step S303 described above.

If the value "i" of the counter is less than or equal to the predetermined value "N", in step S403, the sampling module 1001 samples the digital ambient noise signals to obtain the sampled signals in the current sampling period.

In step S404, the analyzing module 1002 analyzes the sampled signals in the current sampling period to determine the ambient noise frequency band(s) in the current sampling period.

In step S405, the value "i" of the counter is increased by 1, and the procedure goes to step S402 described above.

Figure 5:
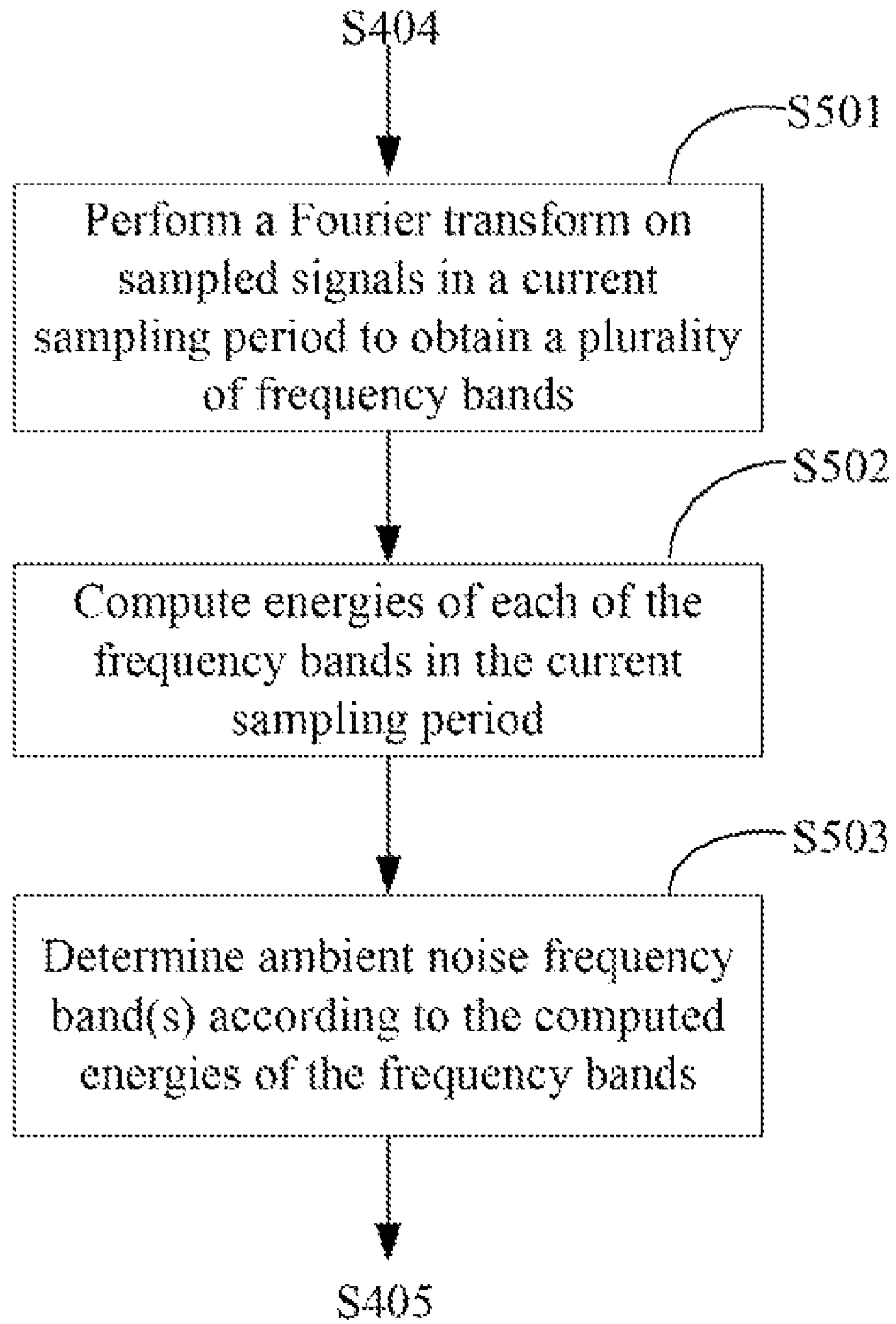
FIG. 5 is a flowchart of a preferred method of implementing step S404 of FIG. 4.

FIG. 5 is a flowchart of a preferred method of implementing step S404 of FIG. 4, namely determining the ambient noise frequency band(s) in the current sampling period. In step S501, the analyzing module 1002 performs a Fourier transform on the sampled signals in the current sampling period from the sampling module 1001, and obtains a plurality of frequency bands in the current sampling period, for example, a frequency band ranging from 20 HZ to 300 HZ, a frequency band ranging from 300 HZ to 500 HZ, a frequency band ranging from 500 HZ to 700 HZ, a frequency band ranging from 700 HZ to 900 HZ, a frequency band ranging from 900 HZ to 1100 HZ, and a frequency band ranging from 1100 HZ to 1300 HZ.

In step S502, the analyzing module 1002 computes energies of each of the frequency bands in the current sampling period.

In step S503, the analyzing module 1002 determines the ambient noise frequency band(s) according to the computed energies of the frequency bands. Detailed description will be described later.

Regarding to the determining process mentioned above, in a first preferred embodiment of the present invention, the analyzing module 1002 determines the frequency band(s) whose energy is greater than a predetermined energy value as the ambient noise frequency band(s). For example, if the energy of the frequency band ranging from 20 HZ to 300 HZ is 80, the energy of the frequency band ranging from 300 HZ to 500 HZ is 110, the energy of the frequency band ranging from 500 HZ to 700 HZ is 620, the energy of the frequency band ranging from 700 HZ to 900 HZ is 660, the energy of the frequency band ranging from 900 HZ to 1100 HZ is 560, and the energy of the frequency band ranging from 1100 HZ to 1300 HZ is 510, and if the predetermined energy value is 650, the analyzing module 1002 determines the frequency band ranging from 700 HZ to 900 HZ as the ambient noise frequency band.

In a second preferred embodiment of the present invention, the analyzing module 1002 sorts the frequency bands according to the energies in descending order thus to obtain an energy sorting list, and orderly selects a predetermined number of frequency bands from the energy sorting list as the ambient noise frequency band(s). For example, if the energy of the frequency band ranging from 20 HZ to 300 HZ is 80, the energy of the frequency band ranging from 300 HZ to 500 HZ is 110, the energy of the frequency band ranging from 500 HZ to 700 HZ is 620, the energy of the frequency band ranging from 700 HZ to 900 HZ is 660, the energy of the frequency band ranging from 900 HZ to 1100 HZ is 560, and the energy of the frequency band ranging from 1100 HZ to 1300 HZ is 510, and if the predetermined number is 2, the analyzing module 1002 determines the frequency bands ranging from 500 HZ to 700 HZ and from 700 HZ to 900 HZ respectively as the ambient noise frequency bands.

In a third preferred embodiment of the present invention, the analyzing module 1002 computes a normal energy value of each frequency band by dividing the energy of the frequency band by a total energy of all the frequency bands, and determines the frequency band(s) whose normal energy value is greater than a predetermined normal energy value as the ambient noise frequency band(s). For example, if the normal energy value of the frequency band ranging from 20 HZ to 300 HZ is 0.03, the normal energy value of the frequency band ranging from 300 HZ to 500 HZ is 0.04, the normal energy value of the frequency band ranging from 500 HZ to 700 HZ is 0.25, the normal energy value of the frequency band ranging from 700 HZ to 900 HZ is 0.26, the normal energy value of the frequency band ranging from 900 HZ to 1100 HZ is 0.22, and the normal energy value of the frequency band ranging from 1100 HZ to 1300 HZ is 0.20, and if the predetermined normal energy value is 0.25, the analyzing module 1002 determines the frequency band ranging from 700 HZ to 900 HZ as the ambient noise frequency band.

Figure 6:
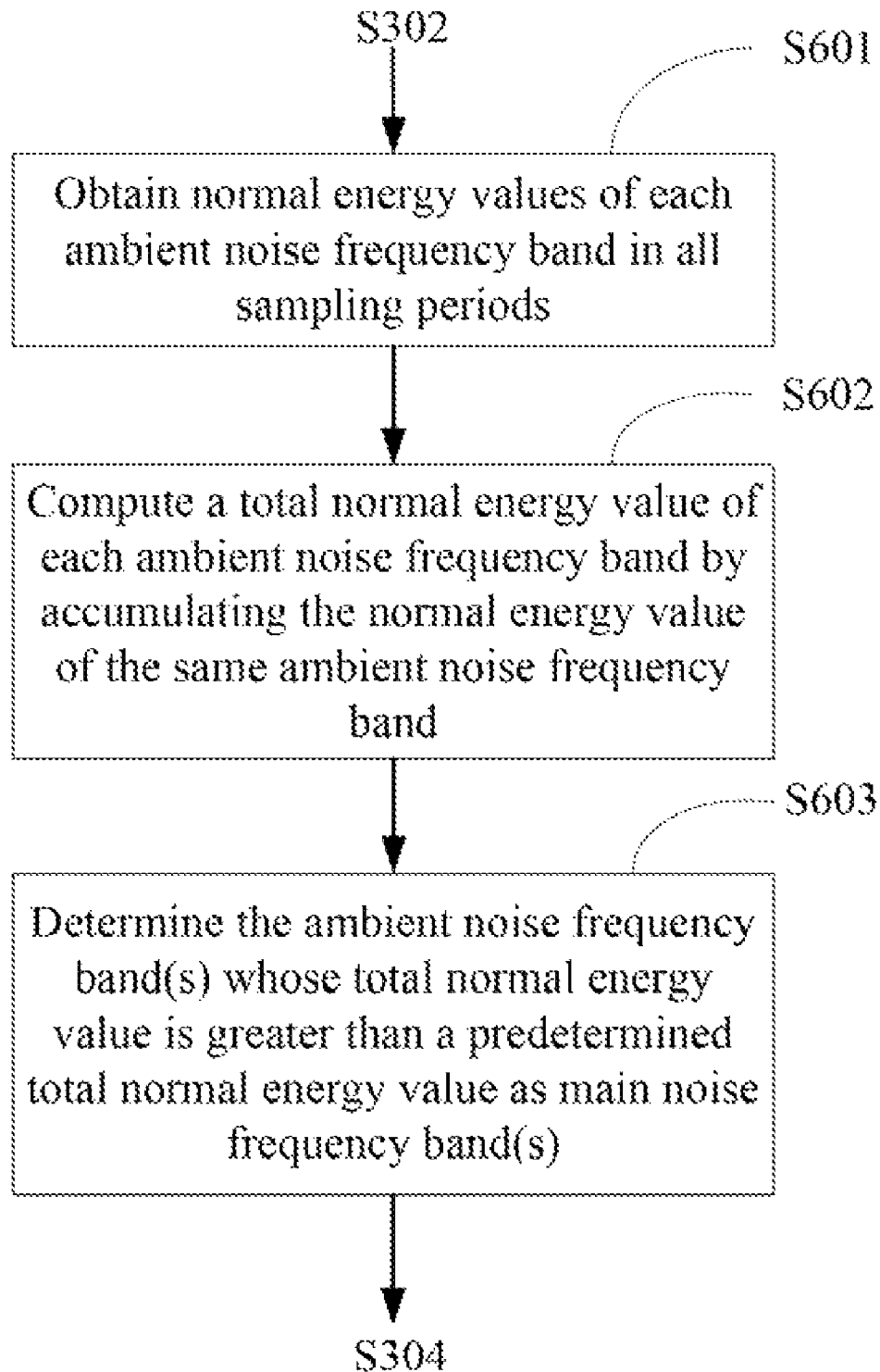
FIG. 6 is a flowchart of a first preferred method of implementing step S303 of FIG. 3.

FIG. 6 is a flowchart of a first preferred method of implementing step S303 of FIG. 3, namely determines the main noise frequency band(s) by statistically analyzing all the ambient noise frequency bands. In step S601, the filtering parameter determining module 1003 obtains the normal energy value of each ambient noise frequency band in all the sampling periods.

In step S602, the filtering parameter determining module 1003 computes a total normal energy value of each ambient noise frequency band by accumulating the normal energy value of the same ambient noise frequency band that appears in all the sampling periods.

In step S603, the filtering parameter determining module 1003 determines the ambient noise frequency band(s), whose total normal energy value is greater than a predetermined total normal energy value, as the main noise frequency band(s) where the ambient noise frequently appears and mainly distributes. For example, if the total normal energy value of the ambient noise frequency band ranging from 300 HZ to 500 HZ is 0.9, the total normal energy value of the ambient noise frequency band ranging from 500 HZ to 700 HZ is 1.8, the total normal energy value of the ambient noise frequency band ranging from 700 HZ to 900 HZ is 2.6, the total normal energy value of the ambient noise frequency band ranging from 900 HZ to 1100 HZ is 2.1, and the total normal energy value of the ambient noise frequency band ranging from 1100 HZ to 1300 HZ is 1.2, and if the predetermined total normal energy value is 2.5, the filtering parameter determining module 1003 determines the ambient noise frequency band ranging from 700 HZ to 900 HZ as the main noise frequency band.

Figure 7:
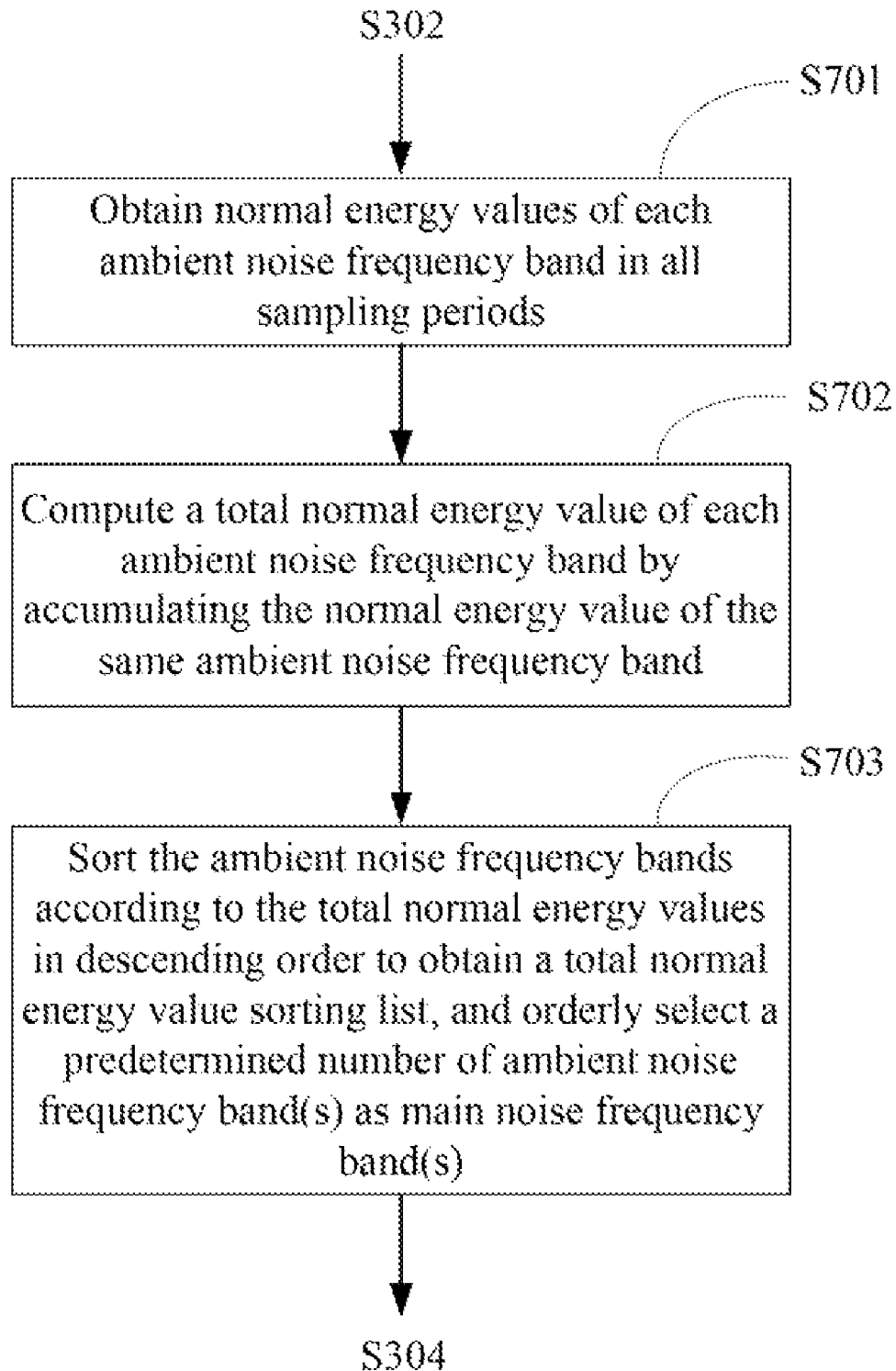
FIG. 7 is a flowchart of a second preferred method of implementing step S303 of FIG. 3.

FIG. 7 is a flowchart of a second preferred method of implementing step S303 of FIG. 3, namely determines the main noise frequency band(s) by statistically analyzing all the ambient noise frequency bands. In step S701, the filtering parameter determining module 1003 obtains the normal energy value of each ambient noise frequency band in all the sampling periods.

In step S702, the filtering parameter determining module 1003 computes the total normal energy value of each ambient noise frequency band by accumulating the normal energy value of the same ambient noise frequency band that appears in all the sampling periods.

In step S703, the filtering parameter determining module 1003 sorts the ambient noise frequency bands according to the total normal energy values in descending order thus to obtain a total normal energy value sorting list, and orderly selects a predetermined number of ambient noise frequency bands from the total normal energy value sorting list as the main noise frequency band(s). For example, if the total normal energy value of the ambient noise frequency band ranging from 300 HZ to 500 HZ is 0.9, the total normal energy value of the ambient noise frequency band ranging from 500 HZ to 700 HZ is 1.8, the total normal energy value of the ambient noise frequency band ranging from 700 HZ to 900 HZ is 2.6, the total normal energy value of the ambient noise frequency band ranging from 900 HZ to 1100 HZ is 2.1, and the total normal energy value of the ambient noise frequency band ranging from 1100 HZ to 1300 HZ is 1.2, and if the predetermined number is 2, the analyzing module 1002 determines the frequency bands ranging from 700 HZ to 900 HZ and from 900 HZ to 1100 HZ respectively as the main noise frequency bands.

Figure 8:
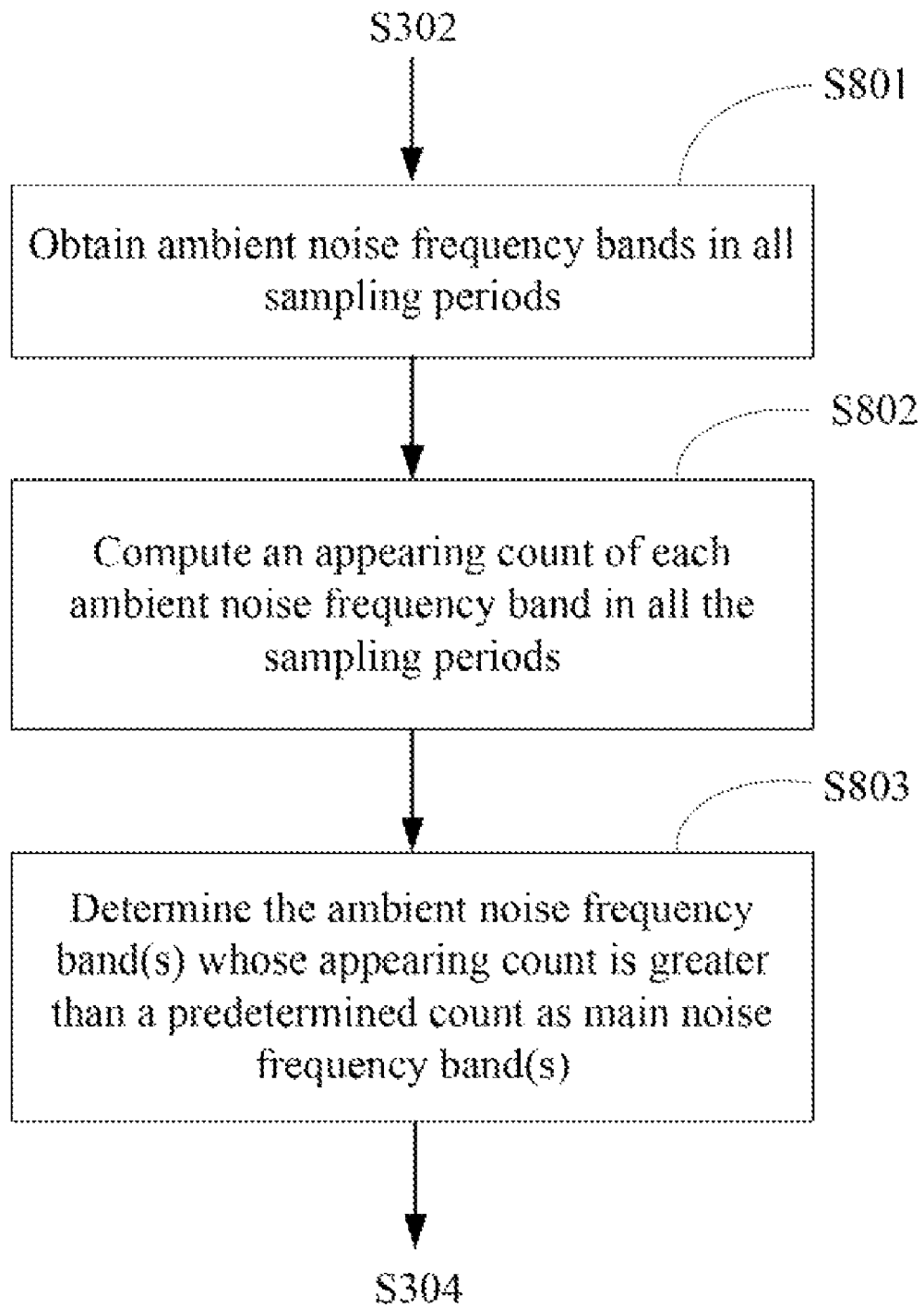
FIG. 8 is a flowchart of a third preferred method of implementing step S303 of FIG. 3.

FIG. 8 is a flowchart of a third preferred method of implementing step S303 of FIG. 3, namely determines the main noise frequency band(s) by statistically analyzing all the ambient noise frequency bands. In step S801, the filtering parameter determining module 1003 obtains the ambient noise frequency bands in all the sampling periods.

In step S802, the filtering parameter determining module 1003 computes an appearing count of each ambient noise frequency band that appears in all the sampling periods.

In step S803, the filtering parameter determining module 1003 determines the ambient noise frequency band(s), whose appearing count is greater than a predetermined count, as the main noise frequency band(s). For example, if the appearing count of the ambient noise frequency band ranging from 300 HZ to 500 HZ is 2, the appearing count of the ambient noise frequency band ranging from 500 HZ to 700 HZ is 6, the appearing count of the ambient noise frequency ranging from 700 HZ to 900 HZ is 5, and the appearing count of the ambient noise frequency band ranging from 900 HZ to 1100 HZ is 1, and the predetermined count is 5, the filtering parameter determining module 1003 determines the ambient noise frequency band ranging from 500 HZ to 700 HZ as the main noise frequency band.

Although the present invention has been specifically described on the basis of preferred embodiments including preferred methods, the invention is not to be construed as being limited thereto. Various changes or modifications may be made to the embodiments including the methods without departing from the scope and spirit of the invention.

What is claimed is:

1. A mobile phone capable of filtering ambient noise, comprising:
    a storage unit;
    a microphone configured for receiving input audio signals and transforming the received input audio signals into analog signals;
    an analog-to-digital converter (ADC) configured for converting the analog signals from the microphone into digital signals; and
    a processing unit comprising:
        a sampling module configured for sampling the digital signals from the ADC to obtain sampled signals;
        an analyzing module configured for performing a Fourier transform on the sampled signals in each sampling period to obtain a plurality of frequency bands in each sampling period, computing a normal energy value of each frequency band by dividing an energy of the frequency band by a total energy of all the frequency bands, and determining the frequency band(s) whose normal energy value is greater than a predetermined normal energy value as the ambient noise frequency band(s), and storing the determined ambient noise frequency band(s), in each sampling period, in the storage unit;
        a filtering parameter determining module configured for statistically analyzing the ambient noise frequency bands in all sampling periods to determine main noise frequency band(s), and for storing the determined main noise frequency band(s) in the storage unit; and
        a filtering module configured for filtering out ambient noise having main noise frequency band(s) that are outside of a speech frequency band.

2. The mobile phone according to claim 1, wherein the speech frequency band is preloaded in the storage unit.

3. The mobile phone according to claim 1, wherein the speech frequency band is obtained by a same process as that of obtaining the main noise frequency band(s).

4. The mobile phone according to claim 1, wherein the filtering parameter determining module computes a total normal energy value of each ambient noise frequency band by accumulating the normal energy value of the same ambient noise frequency band in all sampling periods, and determines the ambient noise frequency band(s) whose total normal energy value is greater than a predetermined total normal energy value as the main noise frequency band(s).

5. The mobile phone according to claim 1, wherein the filtering parameter determining module computes a total normal energy value of each ambient noise frequency band by accumulating the normal energy value of the same ambient noise frequency band in all sampling periods, sorts the ambient noise frequency bands according to the total normal energy values in descending order to obtain a total normal energy value sorting list, and orderly selects a predetermined number of ambient noise frequency band(s) from the total normal energy values sorting list as the main noise frequency band(s).

6. The mobile phone according to claim 1, wherein the filtering parameter determining module computes an appearing count of each ambient noise frequency band that appears in all sampling periods, and determines the ambient noise frequency band(s) whose appearing count is greater than a predetermined count as the main noise frequency band(s).

7. An ambient noise filtering method adapted for a mobile phone, comprising:
    receiving ambient noise during a predetermined period of the absence of speech and transforming the received ambient noise into analog ambient noise signals;
    converting the analog ambient noise signals into digital ambient noise signals;
    sampling the digital ambient noise signals to obtain multiple groups of sampled signals; performing a Fourier transform on the sampled signals in each sampling period to obtain a plurality of frequency bands in each sampling period; computing a normal energy value of each frequency band by dividing an energy of the frequency band by a total energy of all the frequency bands; and determining the frequency band(s) whose normal energy value is greater than a predetermined normal energy value as the ambient noise frequency band(s);
    determining main noise frequency band(s) by statistically analyzing all the ambient noise frequency bands, wherein the main noise frequency band is a frequency band where the ambient noise concentrates and mainly distributes; and
    filtering the ambient noise out of signals generated during a communication by filtering the determined main noise frequency band(s) if the main noise frequency band(s) does not have a same range as that of a speech frequency band.

8. The ambient noise filtering method according to claim 7, wherein the determining step further comprises:
   computing a total normal energy value of each ambient noise frequency band by accumulating the normal energy value of the same ambient noise frequency band in all sampling periods; and
   determining the ambient noise frequency band(s) whose total normal energy value is greater than a predetermined total normal energy value as the main noise frequency band(s).

9. The ambient noise filtering method according to claim 7, wherein the determining step further comprises:
   computing a total normal energy value of each ambient noise frequency band by accumulating the normal energy value of the same ambient noise frequency band in all sampling periods;
   sorting the ambient noise frequency bands according to the total normal energy values in descending order to obtain a total normal energy value sorting list; and
   orderly selecting a predetermined number of ambient noise frequency band(s) from the total normal energy values sorting list as the main noise frequency band(s).

10. The ambient noise filtering method according to claim 7, wherein the determining step further comprises:
   computing an appearing count of each ambient noise frequency band that appears in all sampling periods; and
   determining the ambient noise frequency band(s) whose appearing count is greater than a predetermined count as the main noise frequency band(s).

* * * * *